United States Patent
Kim

(10) Patent No.: US 11,237,590 B2
(45) Date of Patent: Feb. 1, 2022

(54) COVER MEMBER AND DISPLAY DEVICE INCLUDING THE SAME

(71) Applicant: Samsung Display Co., Ltd., Yongin-si (KR)

(72) Inventor: Sebong Kim, Asan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 26 days.

(21) Appl. No.: 16/677,240

(22) Filed: Nov. 7, 2019

(65) Prior Publication Data

US 2020/0159285 A1 May 21, 2020

(30) Foreign Application Priority Data

Nov. 19, 2018 (KR) .................. 10-2018-0142414

(51) Int. Cl.
*G06F 1/16* (2006.01)

(52) U.S. Cl.
CPC .......... *G06F 1/1609* (2013.01); *G06F 1/1626* (2013.01); *G06F 1/1652* (2013.01)

(58) Field of Classification Search
CPC .... G06F 1/1609; G06F 1/1626; G06F 1/1652; G09F 9/301
See application file for complete search history.

(56) References Cited

U.S. PATENT DOCUMENTS

| | | | |
|---|---|---|---|
| 10,036,917 B2 | 7/2018 | Park | |
| 10,781,135 B2* | 9/2020 | Weber | C03C 21/002 |
| 2013/0140965 A1* | 6/2013 | Franklin | G06F 1/1626 |
| | | | 312/223.1 |
| 2015/0274585 A1* | 10/2015 | Rogers | C03C 21/002 |
| | | | 361/679.26 |
| 2016/0117004 A1* | 4/2016 | Lee | B32B 17/10 |
| | | | 428/323 |
| 2017/0102809 A1* | 4/2017 | Son | G06F 3/0447 |
| 2018/0056636 A1 | 3/2018 | Xie | |
| 2018/0114943 A1* | 4/2018 | Lee | H01L 27/3255 |
| 2018/0197933 A1* | 7/2018 | Son | H01L 27/3248 |
| 2018/0217639 A1* | 8/2018 | Jones | G06F 1/1652 |

FOREIGN PATENT DOCUMENTS

| | | |
|---|---|---|
| KR | 10-2015-0061357 A | 6/2015 |
| KR | 10-1656429 B1 | 10/2016 |
| KR | 10-2017-0134842 A | 12/2017 |
| KR | 10-2018-0026191 A | 3/2018 |

\* cited by examiner

*Primary Examiner* — Rockshana D Chowdhury
(74) *Attorney, Agent, or Firm* — Lewis Roca Rothgerber Christie LLP

(57) ABSTRACT

A display panel cover member includes: a window having a plate shape and the window having a front surface, a rear surface opposite the front surface, and a first side surface between the front surface and the rear surface; and a protective film around the window. The protective film includes: an upper portion on the front surface of the window; a lower portion on the rear surface of the window; and a side portion on the first side surface of the window and connecting the upper portion and the lower portion of the protective film to each other.

21 Claims, 13 Drawing Sheets

\*PF . SP, UP, LP
\*CM . HC, BM, AF, W, PF

COVER MEMBER AND DISPLAY DEVICE INCLUDING THE SAME

CROSS-REFERENCE TO RELATED APPLICATION

This application claims priority to and the benefit of Korean Patent Application No. 10-2018-0142414, filed on Nov. 19, 2018, in the Korean Intellectual Property Office (KIPO), the content of which is incorporated herein in its entirety by reference.

BACKGROUND

1. Field

Embodiments of the present inventive concept relate to a display panel cover member and a display device including the display panel cover member.

2. Discussion of Related Art

In recent times, liquid crystal display ("LCD") devices or organic light emitting diode ("OLED") display devices may be used as a display device for mobile electronic devices (e.g., mobile phones, navigation devices, digital cameras, electronic books, portable game machines, and various terminals).

In a related display device used in such mobile electronic devices, a cover window that is transparent may be in front of a display panel so that users may view a display area of the display panel. Because the cover window is formed at an outermost part of the device, it should be strong against external impact to protect the display panel in the device.

In recent times, a structure employing a touch panel that is integrated with a display screen has been used instead of a switch or a keyboard as an input device. Due to the touch panel, a surface of the cover window may be more often brought into contact with an external object (e.g., a finger) as compared to a related mobile device without a touch panel integrated with a display screen. Accordingly, a higher rigidity is desirable for such cover windows.

In addition, in recent times, studies have been actively conducted on display devices that may be foldable or may be rollable. A cover window applied to such display devices may include a flexible member that may be foldable.

However, the rigidity (which typically implies higher resistance to damage from impact) and flexibility of the cover window may be in a trade-off relationship with each other, and thus the cover window of a foldable or a rollable display device may be more easily damaged by an external impact.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY

Aspects of some embodiments of the present inventive concept may be directed to a cover for a display device with improved impact resistance and a display device including the cover.

According to an embodiment, a display panel cover includes: a window having a plate shape and the window having a front surface, a rear surface opposite the front surface, and a first side surface between the front surface and the rear surface; and a protective film around the window. The protective film includes: an upper portion on the front surface of the window; a lower portion on the rear surface of the window; and a side portion on the first side surface of the window and connecting the upper portion and the lower portion of the protective film to each other.

The window may include an anti-fingerprint layer at the front surface of the window.

The window may include a foldable glass, and may have a thickness that is less than or substantially equal to about 75 μm.

The window may have a second side surface opposite the first side surface, and the side portion of the protective film may be on the second side surface of the window.

The window may have a third side surface between the first side surface and the second side surface, and a fourth side surface opposite the third side surface, and the side portion of the protective film may be on the third side surface and the fourth side surface of the window.

The window may have a third side surface between the first side surface and the second side surface, and a fourth side surface opposite the third side surface, and the third side surface and the fourth side surface of the window may not be covered by the protective film.

The side portion of the protective film may cover an entire portion of the first side surface of the window.

The side portion of the protective film may have a depressed portion that is depressed toward the first side surface of the window.

A bottom of the depressed portion that is closest to the first side surface of the window in a direction perpendicular to the first side surface of the window may be located between the front surface and the rear surface of the window in a direction perpendicular to the front and rear surfaces.

A distance between the bottom of the depressed portion and the first side surface of the window may be in a range from about 10 μm to about 200 μm.

The depressed portion may extend over an entire portion of the side portion in a direction parallel to the front surface and the side first surface of the window.

The side portion of the protective film has a plurality of depressions spaced apart from each other, and the plurality of depressions may be arranged between the front surface and the rear surface of the window in a direction perpendicular to the front and rear surfaces.

At least a part of the plurality of depressions may expose the first side surface of the window.

The display panel cover may further include a light blocking layer that is at an upper surface of the side portion of the protective film and at an upper surface of the upper portion adjacent to the side portion, and overlaps the depressed portion and the first side surface of the window in a plan view.

The side portion of the protective film may include: a first edge portion extending from the upper portion of the protective film; and a second edge portion extending from the lower portion of the protective film. The first edge portion and the second edge portion may include: respective connection portions located within a set distance from the first side surface of the window adjacent thereto, the respective connection portions being connected to each other; and respective non-connection portions located out of the set distance and not connected to each other.

The non-connection portions of the first and second edge portions may be spaced apart from each other.

The display panel cover may further include a hard coating layer at an upper surface of the upper portion of the protective film.

Each of the upper portion and the lower portion of the protective film may have a thickness in a range from about 100 µm to about 200 µm.

The side portion of the protective film may have a length that is greater than or substantially equal to about 500 µm in a direction perpendicular to the first side surface of the window.

The protective film may have a Young's modulus that is less than or substantially equal to about 500 MPa.

According to an embodiment, a display device includes: a display panel; and a cover on the display panel. The cover includes: a window having a plate shape and having a front surface, a rear surface opposite the front surface, and a side surface between the front surface and the rear surface; and a protective film around the window. The protective film includes: a lower portion between the rear surface of the window and the display panel; an upper portion on the front surface of the window; and a side portion on the side surface of the window, and connecting the upper portion and the lower portion of the protective film.

The display device may be foldable or rollable.

The foregoing is illustrative only and is not intended to be in any way limiting. In addition to the illustrative aspects, embodiments and features described above, further aspects, embodiments and features will become apparent by reference to the drawings and the following detailed description.

BRIEF DESCRIPTION OF THE DRAWINGS

A more complete appreciation of the present inventive concept will become more apparent by describing in more detail embodiments thereof with reference to the accompanying drawings, wherein.

DETAILED DESCRIPTION

Figure 1:
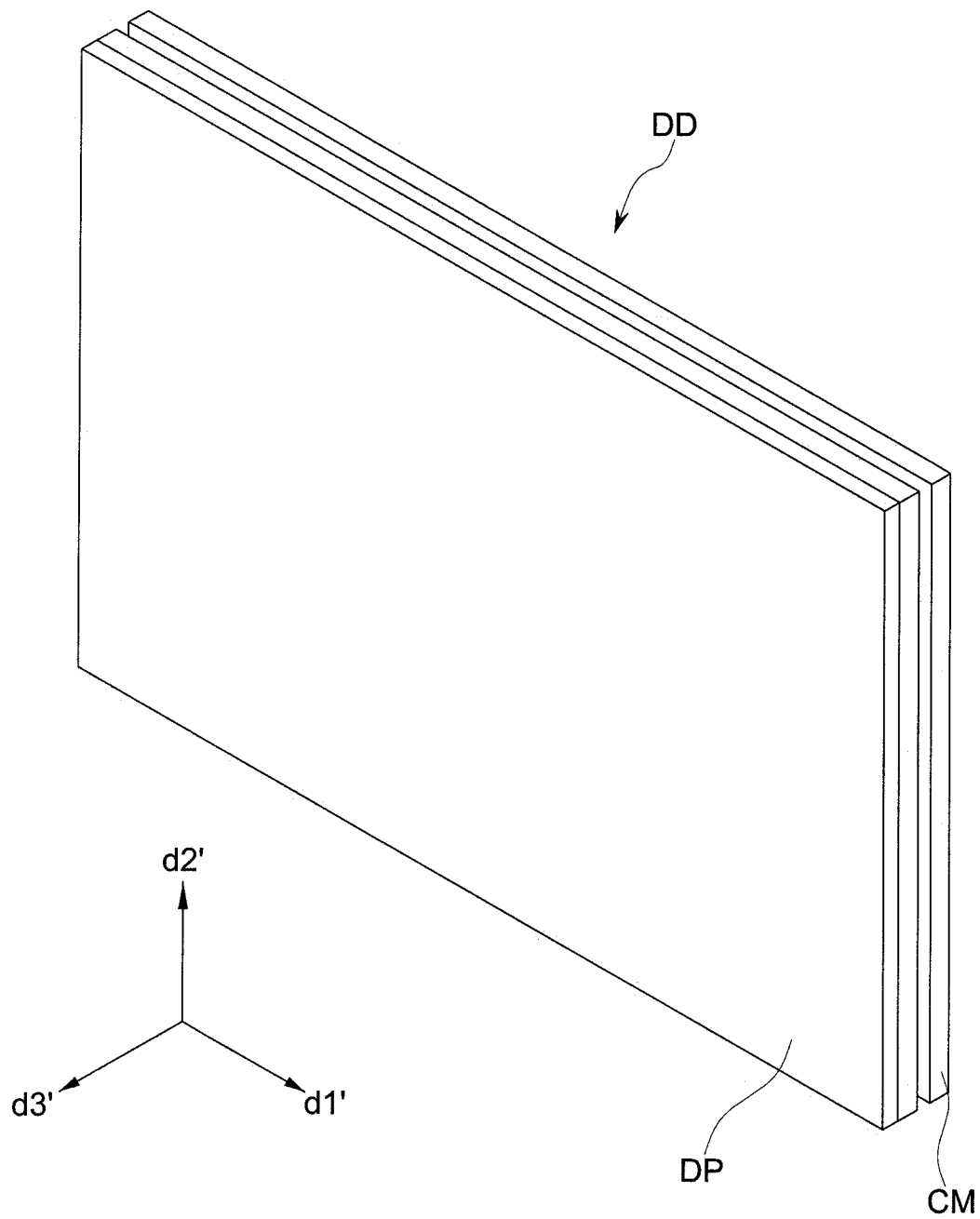
FIG. 1 is a perspective view illustrating a display device DD according to an embodiment.

Embodiments will now be described more fully hereinafter with reference to the accompanying drawings. Although the present disclosure may be modified in various suitable manners and have several embodiments, embodiments are illustrated in the accompanying drawings and will be mainly described in the specification. However, the scope of the present disclosure is not limited to the embodiments and should be construed as including all the changes, equivalents, and substitutions included in the spirit and scope of the present disclosure.

In the drawings, thicknesses of a plurality of layers and areas are illustrated in an enlarged manner for clarity and ease of description thereof. When a layer, area, or plate is referred to as being "on" another layer, area, or plate, it may be directly on the other layer, area, or plate, or intervening layers, areas, or plates may be present therebetween. Conversely, when a layer, area, or plate is referred to as being "directly on" another layer, area, or plate, intervening layers, areas, or plates may be absent therebetween. Further, when a layer, area, or plate is referred to as being "below" another layer, area, or plate, it may be directly below the other layer, area, or plate, or intervening layers, areas, or plates may be present therebetween. Conversely, when a layer, area, or plate is referred to as being "directly below" another layer, area, or plate, intervening layers, areas, or plates may be absent therebetween.

The spatially relative terms "below", "beneath", "lower", "above", "upper" and the like, may be used herein for ease of description to describe the relations between one element or component and another element or component as illustrated in the drawings. It will be understood that the spatially relative terms are intended to encompass different orientations of the device in use or operation, in addition to the orientation illustrated in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in the other direction and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the inventive concept."

"About," "substantially," or "approximately" as used herein is inclusive of the stated value and refers to within an acceptable range of deviation for the particular value as determined by one of ordinary skill in the art, considering the measurement in question and the error associated with measurement of the particular quantity (i.e., the limitations of the measurement system). For example, "about" may refer to within one or more standard deviations, or within ±30%, 20%, 10%, 5% of the stated value.

Also, any numerical range recited herein is intended to include all subranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

When a certain embodiment may be implemented differently, a specific process order may be performed differently from the described order. For example, two consecutively described processes may be performed substantially at the same time or performed in an order opposite to the described order.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms used herein (including technical and scientific terms) have the same meaning as commonly understood by those skilled in the art to which the present disclosure pertains. It will be further understood that terms, such as those defined in commonly used dictionaries, should be interpreted as having a meaning that is consistent with their meaning in the context of the relevant art and will not be interpreted in an ideal or excessively formal sense unless clearly defined at the present specification.

Some of the parts which are not associated with the description may not be provided in order to specifically describe embodiments of the present disclosure and like reference numerals refer to like elements throughout the specification.

Hereinafter, embodiments of the present disclosure will be described with reference to FIGS. 1-16.

Figure 2:
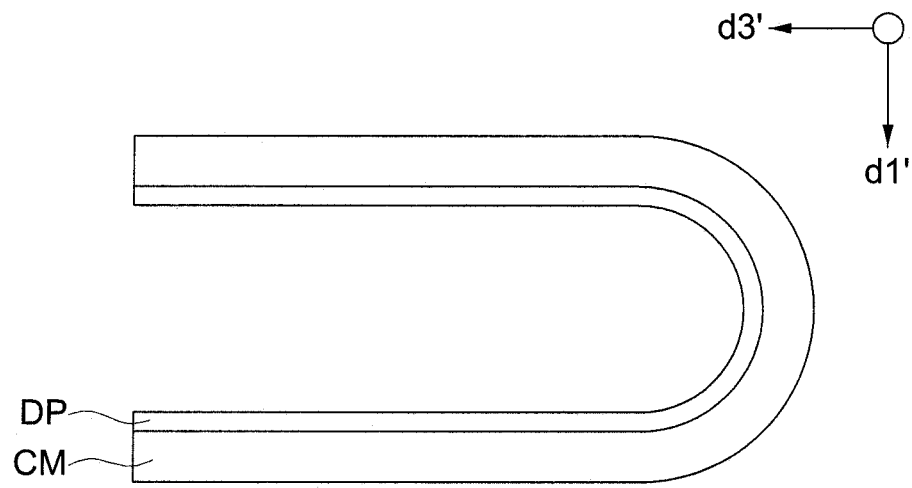
FIG. 2 is a cross-sectional view illustrating the display device DD of FIG. 1 when it is folded.
Figure 3:
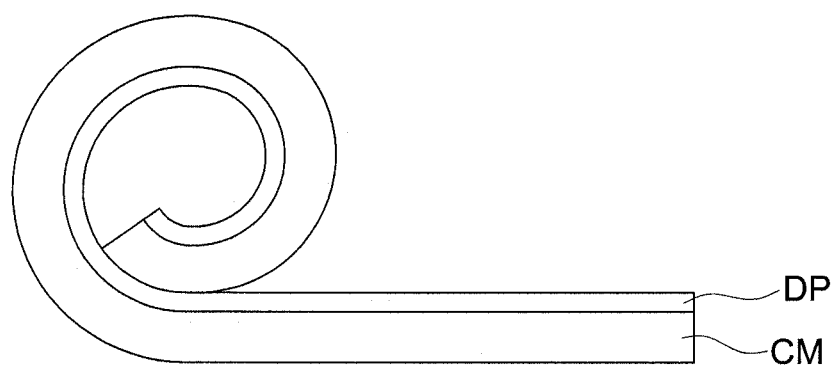
FIG. 3 is a cross-sectional view illustrating the display device DD of FIG. 1 when it is rolled.
Figure 3:
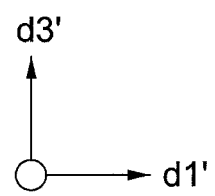

FIG. 1 is a perspective view illustrating a display device DD according to an embodiment. FIG. 2 is a cross-sectional view illustrating the display device DD of FIG. 1 when it is folded. FIG. 3 is a cross-sectional view illustrating the display device DD of FIG. 1 when it is rolled.

The display device DD may include a display panel DP at which images are displayed and a cover member (e.g., a cover) CM that may be disposed on a side where images are displayed.

The display device DD, including the display panel DP and the cover member CM, may be provided in a flat state as illustrated in FIG. 1, but at least parts of the display panel DP and the cover member CM may be transformed (e.g., rolled or folded to change from a flat state to a state having a different shape), and parts of the display panel DP may be provided in a state having different shapes.

Referring to FIGS. 1-3, at least a part of the display device DD according to an embodiment may be flexible. In an embodiment, an entire portion of the display device DD may be flexible. Because the display device DD may be flexible, it may be folded as illustrated in FIG. 2, or rolled as illustrated in FIG. 3, according to the flexible area.

A folding line along which the display device DD may be folded may pass through a center of the display device DD and may be parallel to a second direction d2', but the position of the folding line is not limited thereto. In an embodiment, the folding line may be provided in a direction parallel to a first direction d1', or may be provided in an oblique direction with respect to the first direction d1', or the second direction d2'. It is not necessary that the folding line invariably passes through the center of the display device DD. In addition, when the display device DD is folded along the folding line, it may be folded so that a front surface at which images are displayed becomes an inner side (e.g., relative to a user's viewing angle), or may be folded so that the front surface at which images are displayed becomes an outer side. According to an embodiment, when the display device DD is folded along a plurality of folding lines, a part of the display device DD may be folded so that the front surface becomes an inner side, and another part of the display device DD may be folded so that the front surface becomes an outer side.

A third direction d3' may be perpendicular to the first direction d1' and the second direction d2'. A length of the display device DD in the first direction d1' may be greater than a length of the display device DD in the second direction d2'. The first direction d1', the second direction d2', and the third direction d3' may be referred to as a length direction, a width direction and a thickness direction, respectively, of the display device DD, the display panel DP, and the cover member (e.g., the cover) CM.

The display device DD may be rolled so that one surface faces another surface. A direction in which the display device DD is rolled may be in the first direction d1' or in the second direction d2'. However, the rolled direction is not limited thereto, and the display device DD may be rolled in an oblique direction with respect to the first direction d1' and/or the second direction d2'. In an embodiment, in the display device DD, an area to be rolled may be a part of the display device DD, or alternatively, an entire area thereof may be rolled.

Although flexibility has been described with reference to the display device DD for the sake of convenience, it may be applied to all of the display panel DP, the cover member (e.g., the cover) CM, and each layer constituting them.

Figure 4:
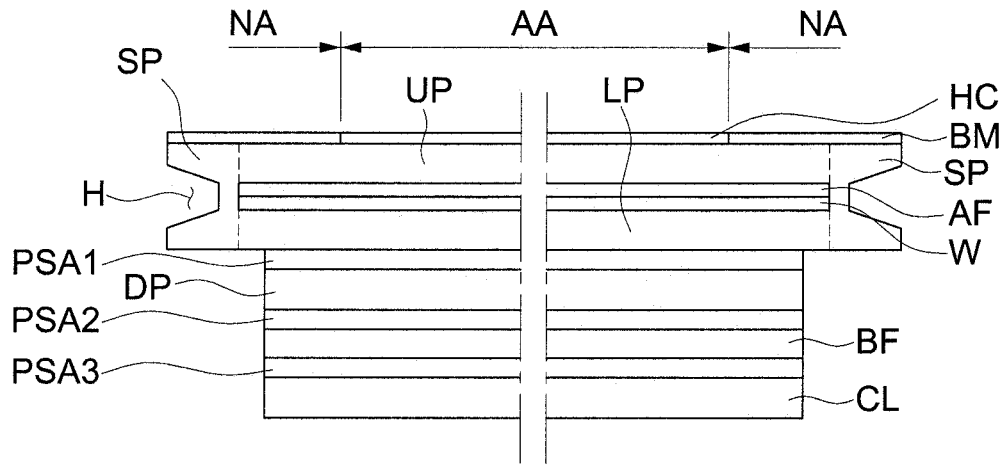
FIG. 4 is a cross-sectional view illustrating a display device DD according to an embodiment.

FIG. 4 is a cross-sectional view illustrating a display device DD according to an embodiment.

The display panel DP may display images. The display panel DP may include a substrate, a plurality of pixels disposed on one surface of the substrate, and at least one conductive line electrically connected to the pixels. At least a part of the substrate may include a flexible material. The conductive line may include at least one gate line or at least one data line. According to an embodiment, a plurality of gate lines and a plurality of data lines may be arranged with each other in a matrix, and the plurality of pixels may be aligned adjacent to points where lines intersect or cross, and electrically connected thereto.

According to an embodiment, the display panel DP may include an LCD panel, a light emitting diode (LED) panel, an OLED display panel, a microelectromechanical system (MEMS) display panel, or an electronic paper display panel. The display panel DP may be flexible.

The display panel DP may include a display area AA and a non-display area NA around the display area AA.

The display area AA is an area for displaying a screen. A planar shape of the display area AA may be a quadrangle or a quadrangle with rounded corners. The planar shape of the display area AA is not limited to a quadrangle, but may have a circular shape, an elliptical shape, or various suitable other shapes. The display area AA may include an active area including the plurality of pixels.

The non-display area NA may be arranged around the display area AA. The non-display area NA may form an edge of the display panel DP.

A driving unit for driving pixel circuits of the display area AA may be disposed at the non-display area NA. The driving unit may include a driving circuit and a driving wiring for transmitting a driving signal.

According to various embodiments, the driving circuit may include a driver IC for providing a driving signal and an image signal to the display panel DP, or a timing controller (T-con) for controlling the driving signal and the image signal. The driver IC may include a gate driver IC for sequentially selecting gate signal lines of the display panel DP and applying a scan signal (or the driving signal) thereto, and a data driver IC (or a source driver IC) for applying image signals to data signal lines of the display panel DP. According to an embodiment, when the gate driver IC selects the gate signal line and applies the scan signal to change a corresponding pixel PX to an active state, the data driver IC may apply the image signal to the corresponding pixel through the data signal line. The timing controller may control a transmission time of the signal transmitted to the driver IC, and thus may substantially prevent or reduce a display time difference that may occur during the process of outputting to the display panel DP.

The cover member (e.g., the cover) CM may be disposed on the front surface of the display panel DP at which the images are displayed. A first adhesive layer PSA1 may be provided between the cover member CM and the front surface of the display panel DP. The cover member CM may transmit light generated by the display panel DP.

The cover member CM may include a window W and a protective film PF around the window W.

The window W may include a flexible material (e.g., tempered glass, reinforced plastic, or polymeric material). According to an embodiment, the window W may be a flexible glass in the form of a thin film. The window W which includes a glass material and is in the form of a thin film may have a thickness of about 100 μm (micrometer) or less, and more preferably, the thin film may have a thickness of about 75 μm or less.

The window W may include an anti-fingerprint layer AF disposed at the front surface thereof. The anti-fingerprint layer AF may include a material substantially the same as the material included in the window W. For example, the anti-fingerprint layer AF may include a fine uneven pattern that is formed by processing the front surface of the window W. In addition, the anti-fingerprint layer AF may include a material different from the material included in the window W. For example, the anti-fingerprint layer AF may be an anti-fingerprint film attached to the front surface of the window W, or an anti-fingerprint coating layer deposited on the front surface of the window W. The anti-fingerprint film or the anti-fingerprint coating layer may include an oil-resistant material or may include an uneven pattern formed on the front surface thereof.

The protective film PF may surround the front surface FS of the window W (or a front surface of the anti-fingerprint layer AF), a rear surface RS of the window W, and a side surface SS between the front surface FS and the rear surface RS of the window W. The protective film PF may have a depressed portion H arranged along the side surface SS of the window W (e.g., depressed toward the window W).

The protective film PF may include a soft material so as to absorb impacts applied to the window W to reduce the risk of the window W being broken. The protective film (PF) may include a plastic base that includes at least one of polyethylene terephthalate (PET), polycarbonate (PC), polymethylmethacrylate (PMMA), polycarbonate/polymethylmethacrylate (PC/PMMA), polyurethane (TPU), or combinations thereof. The protective film PF may have a modulus (e.g., Young's modulus) of about 700 MPa or less, and more preferably about 500 MPa or less.

The cover member CM may include a light blocking layer BM and a hard coat layer HC that are formed on the protective film PF.

The light blocking layer BM may be disposed at the non-display area NA, and may reduce or block light emitted by the display panel DP.

The hard coat layer HC may be disposed at the display area AA. It is preferable that the hard coating layer HC include a material layer having a high rigidity to protect or prevent a front surface of the cover member CM from being cracked or scratched due to external impact or friction. For example, the hard coat layer HC may have a tensile strength in a range from about 20% to about 50%, and more preferably in a range from about 30% to about 40%.

A bottom film BF is disposed below the display panel DP. A second adhesive layer PSA2 may be disposed between the bottom film BF and the display panel DP. The bottom film BF may be a composite sheet of a single layer or multiple layers that serves as a heat dissipation sheet for diffusing heat emitted from the display panel DP, an electromagnetic wave blocking sheet for weakening or blocking electromagnetic waves emitted from the display panel DP, or a black sheet for reducing or blocking the light emitted by the display panel DP.

A cushion layer CL is disposed below the bottom film BF. A third adhesive layer PSA3 may be disposed between the bottom film BF and the cushion layer CL. The cushion layer CL may reduce impacts applied to the display panel DP.

FIGS. 5-10 are cross-sectional perspective views illustrating a cover member (e.g., a cover) CM according to embodiments. Hereinafter, structures of cover members CM according to embodiments will be described in more detail with reference to FIGS. 4-10.

Figure 5:
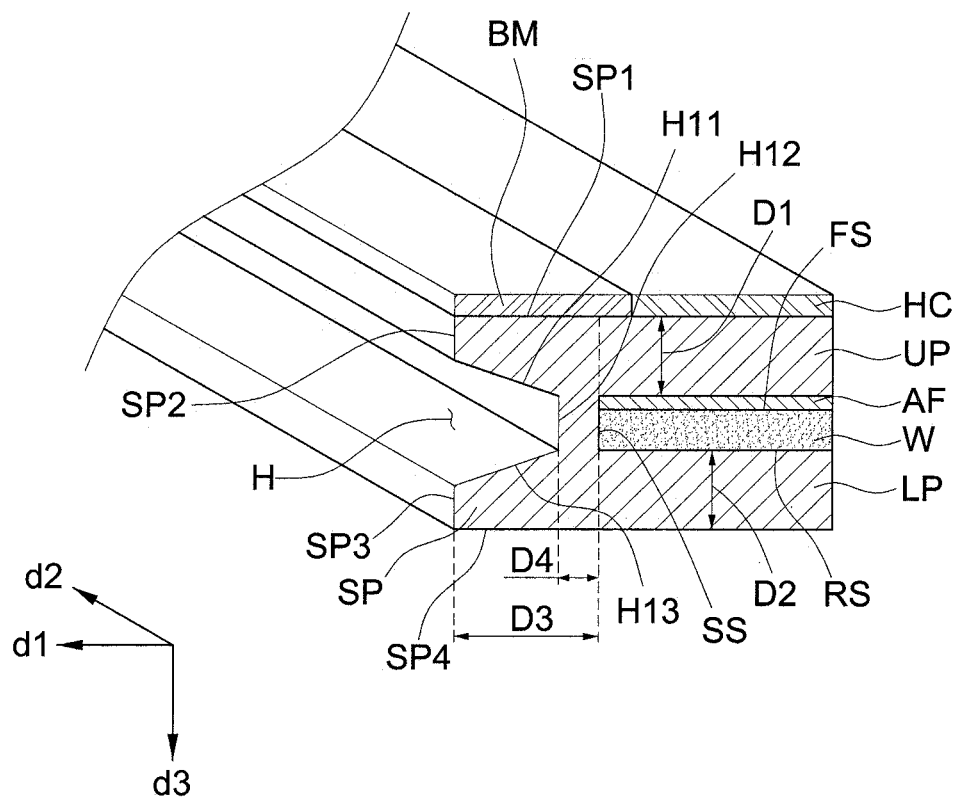
FIGS. 5-10 are cross-sectional perspective views illustrating cover members CM according to embodiments.

First, referring to FIGS. 4-5, a structure of the cover member CM according to an embodiment will be described in more detail.

The cover member CM according to an embodiment includes the window W, the protective film PF around the window W, and the light blocking layer BM and the hard coating layer HC disposed on the protective film PF.

The window W may include a rear surface RS that faces the display panel DP, a front surface FS that is parallel to the rear surface RS and may face an opposite direction of a display panel DP, and one or more side surfaces SS between the front surface FS and the rear surface RS. The side surface SS may contact the front surface FS and the rear surface RS. The front surface FS and the rear surface RS of the window W may have a quadrangular shape. The one or more side surfaces SS of the window W may include a first side surface and a second side surface that are parallel to a width direction of the window W, and a third side surface and a fourth side surface that are parallel to a length direction d2 of the window W. The window W may have a thickness (a distance between the front surface FS and the rear surface RS) of about 100 µm or less, and more preferably about 75 µm or less.

The anti-fingerprint layer AF may be disposed at the front surface FS of the window W. The anti-fingerprint layer AF may include a thin film that includes a fingerprint-proof material attached to the front surface FS of the window W. Alternatively, the anti-fingerprint layer AF may include a part of the window W that is fingerprint-protected. Hereinafter, the front surface FS of the window W may refer to a front surface of the anti-fingerprint layer AF according to example embodiments. In addition, the side surface SS of the window W may refer to a side surface SS of the anti-fingerprint layer AF according to example embodiments.

The protective film PF may surround (or be around) a part of or all of the window W. The protective film PF may surround the front surface FS of the window W, the rear surface RS of the window W and the side surface SS of the window W. The protective film PF may include an upper portion UP that is disposed on the front surface FS of the window W and covers an entire portion of the front surface FS, a lower portion LP that is disposed on the rear surface RS of the window W and covers an entire portion of the rear surface RS, and a side portion SP that is disposed on the side surface SS of the window W and covers an entire portion of the side surface SS.

Each of thicknesses D1 and D2 of the upper portion UP and the lower portion LP of the protective film PF may be in a range from about 50 µm to about 300 µm, and more preferably in a range from about 100 µm to about 200 µm.

The side portion SP of the protective film PF may be connected to the upper portion UP and the lower portion LP of the protective film PF. The upper portion UP, the lower portion LP, and the side portion SP of the protective film PF may refer to parts of the protective film PF that are unitarily formed of substantially the same material. The upper portion UP and the lower portion LP of the protective film PF may be defined as parts of the protective film PF that overlap the window W in a plan view. The side portion SP of the protective film PF may be defined as a part of the protective film PF that does not overlap the window W in a plan view. Accordingly, the side portion SP of the protective film PF does not overlap the window W in the thickness direction d3 of the window W.

The side portion SP of the protective film PF may have an upper surface SP1 and a lower surface SP4. The upper surface SP1 of the side portion SP of the protective film PF may form a planar surface with an upper surface SP1 of the upper portion UP of the protective film PF, and the lower surface SP4 of the side portion SP of the protective film PF may form a planar surface with a lower surface SP4 of the lower portion LP of the protective film PF. The upper surface SP1 of the protective film PF may include the upper surface SP1 of the side portion SP of the protective film PF and the upper surface SP1 of the upper portion UP of the protective film PF. The lower surface SP4 of the protective film PF may include the lower surface SP4 of the side portion SP of the protective film PF and the lower surface SP4 of the lower portion LP of the protective film PF. The upper surface SP1 of the protective film PF may contact the light blocking layer BM and the hard coating layer HC, and the lower surface SP4 of the protective film PF may contact the display panel DP. The protective film PF may include a side surface between the upper surface SP1 and the lower surface SP4 of the protective film PF. The side surface of the protective film PF may refer to a side surface of the side portion SP of the protective film PF.

The side portion SP of the protective film PF may have a depressed portion H that is concave or depressed toward the side surface SS of the window W. The depressed portion H may extend along a length direction d2 of the side portion SP, while spaced apart from the upper surface SP1 and the lower surface SP4 of the protective film PF, between the upper surface SP1 and the lower surface SP4.

In the following description, the length direction of the side portion SP of the protective film PF refers to a direction (d2 in FIG. 5) parallel to the front surface FS and the side surface SS of the window W, and the width direction of the side portion SP of the protective film PF refers to a direction (d1 in FIG. 5) perpendicular to the side surface SS of the window W, and a thickness direction of the side portion SP of the protective film PF refers to a direction (d3 in FIG. 5) perpendicular to the front surface FS of the window W.

The side surface of the side portion SP of the protective film PF may include a first surface SP2 that may contact the upper surface SP1 and a second surface SP3 that may contact the lower surface SP4 of the protective film PF. The side surface of the side portion SP of the protective film PF may include a third surface H11, a fourth surface H12, and a fifth surface H13 that define the depressed portion H between the first surface SP2 and the second surface SP3. The first, second, third, fourth, and fifth surfaces SP2, SP3, H11, H12, and H13 may have predetermined or set widths and may extend along the length direction d2 of the side portion SP.

The first surface SP2 and the second surface SP3 may be parallel to the side surface SS of the window W. The first surface SP2 and the second surface SP3 may be spaced apart from the side surface SS of the window W by substantially the same distance D3. That is, the side portion SP of the protective film PF may have a width D3. The width D3 of the side portion SP of the protective film PF may have a predetermined or set value or other suitable width (e.g., a width with a larger value than the predetermined or set value) for substantially reducing or preventing cracking and scattering caused by impacts applied to an edge of the window W. For example, the width D3 of the side portion SP of the protective film PF may have a length of about 300 μm or more, and more preferably about 500 μm or more. However, embodiments are not limited thereto, and the first surface SP2 and the second surface SP3 may be respectively spaced apart from the side surface SS of the window W by distances different from each other.

A width of the first surface SP2 (a length of the side portion SP in the thickness direction) may be less than a thickness D1 of the upper portion UP of the protective film PF, and a width of the second surface SP3 may be less than a thickness D2 of the lower portion LP of the protective film PF. Alternatively, the width of the first surface SP2 may be substantially equal to or greater than the thickness D1 of the upper portion UP of the protective film PF, and the width of the second surface SP3 may be substantially equal to or greater than the thickness D2 of the lower portion LP of the protective film PF.

The fourth surface H12 may be a surface that is closest to the side surface SS of the window W and may correspond to a bottom of the depressed portion H. A distance D4 between the fourth surface H12 and the side surface SS of the window W (i.e., a width D4 of the side portion SP of the protective film PF at a position corresponding to the bottom H12 of the depressed portion H) may be less than the width D3 of the protective film PF at the first surface SP2 and the second surface SP3. Accordingly, as described below, the upper portion UP and the lower portion LP of the protective film PF may be easily separated from each other. In order to separate the protective film more easily, the width D4 of the side portion SP of the protective film PF may be, for example, about 200 μm or less, and more preferably about 150 μm or less. In addition, in order to substantially prevent or reduce cracking and scattering caused by impacts applied to the edge of the window W, and to substantially prevent or reduce unwanted separation of the upper portion UP and the lower portion LP when the window W is folded, the width D4 of the side portion SP of the protective film PF may be about 10 μm or more, and more preferably about 100 μm or more.

The fourth surface H12 that corresponds to the bottom of the depressed portion H overlaps the side surface SS of the window W, when viewed in the width direction d1 of the side portion SP. For example, a center of the fourth surface H12 in the thickness direction d3 of the side portion SP is located between the front surface FS and the rear surface RS of the window W. The width of the fourth surface H12 (a length in a direction perpendicular to the length direction d2 of the side portion SP) may be substantially equal to the thickness of the window W. Alternatively, the width of the fourth surface H12 may be greater or less than the thickness of the window W.

The third surface H11 contacts the first surface SP2 and the fourth surface H12 that corresponds to a valley (i.e., the bottom) of the depressed portion H, and the fifth surface H13 contacts the fourth surface H12 and the second surface SP3. The third surface H11 and the fifth surface H13 may be spaced increasingly further apart from each other in the thickness direction d3 of the side portion SP as a distance from the side surface SS of the window W increases in the width direction d1 of the side portion SP. Accordingly, a cross-section of the depressed portion H defined at the side portion SP of the protective film PF may have a trapezoidal shape.

The light blocking layer BM is disposed at the upper surface SP1 of the side portion SP of the protective film PF. The light blocking layer BM covers an entire portion of the upper surface SP1 of the side portion SP of the protective film PF and a part of the upper surface SP1 of the upper portion UP. The light blocking layer BM may cover an entire portion of the non-display area NA of the display panel DP. The light blocking layer BM overlaps the depressed portion H in the thickness direction d3 of the side portion SP.

The hard coating layer HC may be disposed at the upper surface SP1 of the upper portion UP of the protective film PF at which the light blocking layer BM is not disposed, and may contact the light blocking layer BM. However, embodiments are not limited thereto, and the hard coat layer HC may be disposed over an entire portion of the upper surface SP1 of the protective film PF. Accordingly, the hard coat layer HC may overlap the light blocking layer BM in a plan view.

FIGS. 6-10 are cross-sectional perspective views illustrating a cover member (e.g., a cover) CM according to other embodiments. Because the cover members CM illustrated in FIGS. 6-10 are substantially the same as the cover member CM described in FIG. 5 except for the shape of the depressed portion H, the disclosure below will mainly describe the shape of the depressed portion H.

Figure 6:
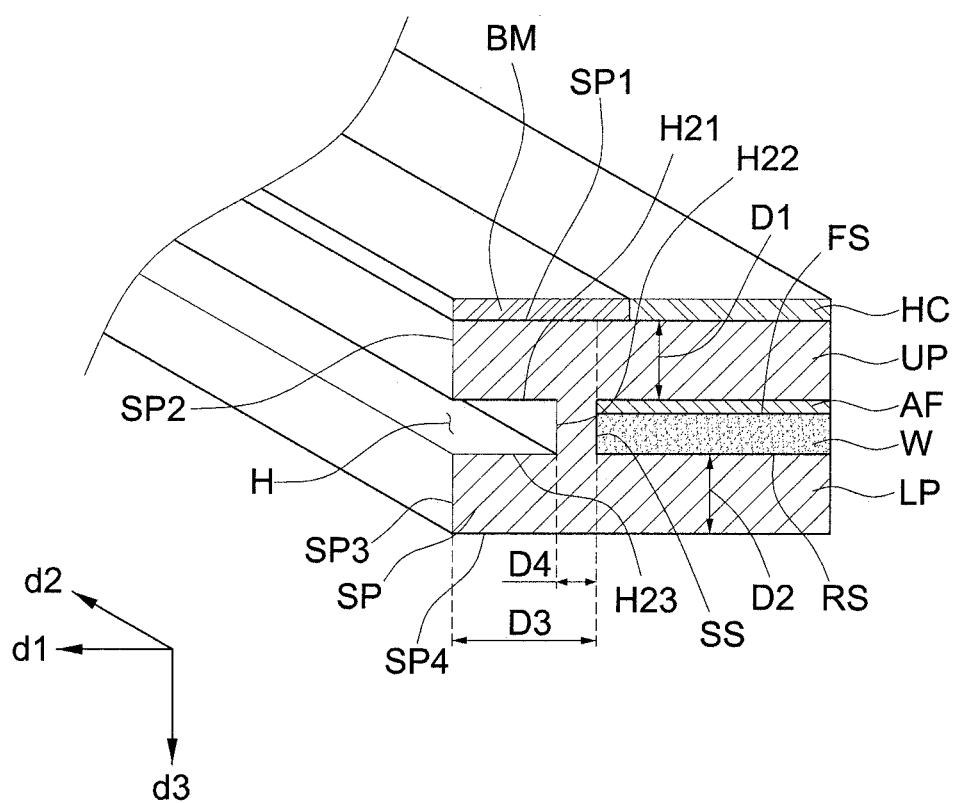

Referring to FIG. 6, the side surface of the side portion SP of the protective film PF may include a first surface SP2 that may contact the upper surface SP1 and a second surface SP3 that may contact the lower surface SP4 of the protective film PF. The side surface of the side portion SP of the protective film may include a third surface H21, a fourth surface H22, and a fifth surface H23 that define the depressed portion H between the first surface SP2 and the second surface SP3.

The fourth surface H22 may be a surface that is closest to the side surface SS of the window W and may correspond to the bottom of the depressed portion H. A distance D4 between the fourth surface H22 and the side surface SS of the window W (i.e., the width D4 of the side portion SP of the protective film PF at a position corresponding to the bottom of the depressed portion H), may be about 200 μm or less, and more preferably about 150 μm or less. The width D4 of the side portion SP of the protective film PF may be about 10 μm or more, and more preferably about 100 μm or more. For example, the width D4 of the side portion SP of the protective PF may be in a range from about 10 μm to about 200 μm, and more preferably a range from about 100 μm to about 150 μm.

The fourth surface H22 that corresponds to the bottom of the depressed portion H overlaps the side surface SS of the window W, when viewed in the width direction d1 of the side portion SP. For example, a center of the fourth surface H22 in the thickness direction d3 of the side portion SP is located between the front surface FS and the rear surface RS of the window W. The width of the fourth surface H22 may be substantially equal to the thickness of the window W. Alternatively, the width of the fourth surface H22 may be greater or less than the thickness of the window W.

The third surface H21 contacts the first surface SP2 and the fourth surface H22 that corresponds to the bottom of the depressed portion H. The fifth surface H23 contacts the fourth surface H22 and the second surface SP3. The third surface H21 and the fifth surface H23 may be parallel to each other. Accordingly, a cross-section of the depressed portion H defined at the side portion SP of the protective film PF may have a quadrangular shape.

Figure 7:
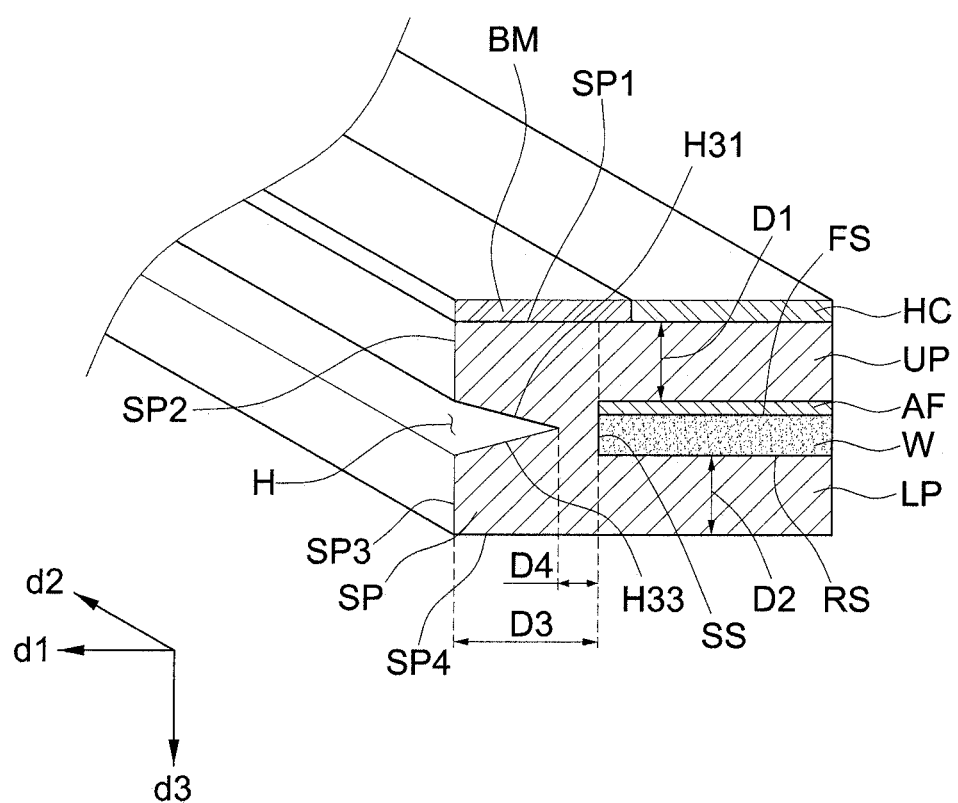

Referring to FIG. 7, the side surface of the side portion SP of the protective film PF includes a first surface SP2 that contacts the upper surface SP1 and a second surface SP3 that contacts the lower surface SP4 of the protective film PF. The side surface of the side portion SP of the protective film PF includes a third surface H31 and a fifth surface H33 that define the depressed portion H between the first surface SP2 and the second surface SP3.

An edge at which the third surface H31 and the fifth surface H33 contact each other may be a position that is closest to the side surface SS of the window W and may correspond to the bottom of the depressed portion H. A distance D4 between the edge at which the third surface H31 and the fifth surface H33 contact each other and the side surface SS of the window W (i.e., the width D4 of the side portion SP of the protective film PF at the bottom of the depressed portion H), may be about 200 µm or less, and more preferably about 150 µm or less. The width D4 of the side portion SP of the protective film PF may be about 10 µm or more, and more preferably about 100 µm or more. For example, the width D4 of the side portion SP of the protective PF may be in a range from about 10 µm to about 200 µm, and more preferably a range from about 100 µm to about 150 µm.

The edge, corresponding to the bottom of the depressed portion H, where the third surface H31 and the fifth surface H33 contact each other overlaps the side surface SS of the window W when viewed in the width direction d1 of the side portion SP. For example, the edge at which the third surface H31 and the fifth surface H33 contact each other is located between the front surface FS and the rear surface RS of the window W in the thickness direction d3 of the side portion SP.

The third surface H31 contacts the first surface SP2 and the fifth surface H33. The fifth surface H33 contacts the second surface SP3 and the third surface H31. The third surface H31 and the fifth surface H33 may be spaced increasingly further apart from each other in the thickness direction d3 of the side portion SP, as a distance from the side surface SS of the window W increases in the width direction d1 of the side portion SP. Accordingly, a cross-section of the depressed portion H defined at the side portion SP of the protective film PF may have a triangular shape.

Figure 8:
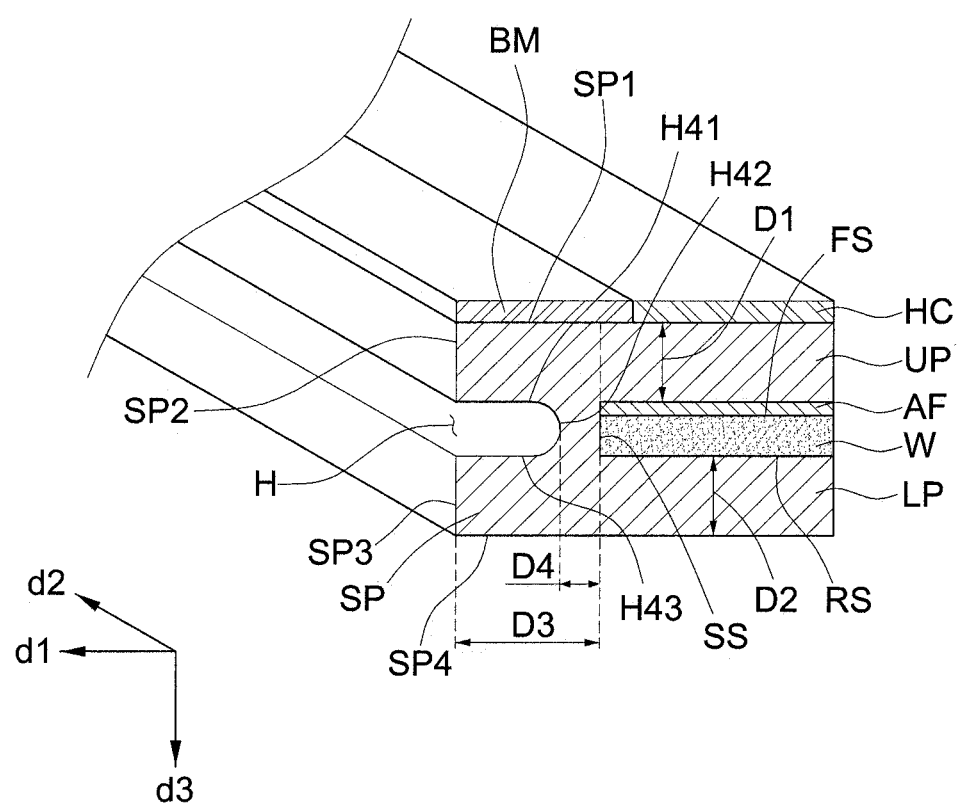

Referring to FIG. 8, the side surface of the side portion SP of the protective film PF may include a first surface SP2 that may contact the upper surface SP1 and a second surface SP3 that may contact the lower surface SP4 of the protective film PF. The side surface of the side portion SP of the protective film PF may include a third surface H41, a fourth source H42, and a fifth surface H43 that define the depressed portion H between the first surface SP2 and the second surface SP3.

The fourth surface H42 is a curved surface having a predetermined or set curvature and its cross-section is a circle (e.g., semi-circle) or an ellipse (e.g., semi-ellipse). A center of the fourth surface H42 in the thickness direction d3 of the side portion SP may correspond to the bottom of the depressed portion H closest to the side surface SS of the window W. The width D4 of the side portion SP of the protective film PF at the bottom of the depressed portion H may be about 200 µm or less, and more preferably about 150 µm or less. The width D4 of the side portion SP of the protective film PF may be about 10 µm or more, and more preferably about 100 µm or more. For example, the width D4 of the side portion SP of the protective PF may be in a range from about 10 µm to about 200 µm, and more preferably a range from about 100 µm to about 150 µm.

The bottom of the depressed portion H that corresponds to the center of the fourth surface H42 in the thickness direction d3 of the side portion SP overlaps the side surface SS of the window W when viewed in the width direction d1 of the side portion SP.

The third surface H41 contacts the fourth surface H42 and the first surface SP2, and the fifth surface H43 contacts the fourth surface H42 and the second surface SP3. The third surface H41 and the fifth surface H43 may be parallel to each other. Accordingly, a cross-section of the depressed portion H defined at the side portion SP of the protective film PF has a U-like shape. Alternatively, the third surface H41 and the fifth surface H43 may be spaced increasingly further apart from each other in the thickness direction d3 of the side portion SP, as a distance from the side surface SS of the window W increases in the width direction d1 of the side portion SP. The third surface H41 and the fifth surface H43 may be curved surfaces like the fourth surface H42.

Figure 9:
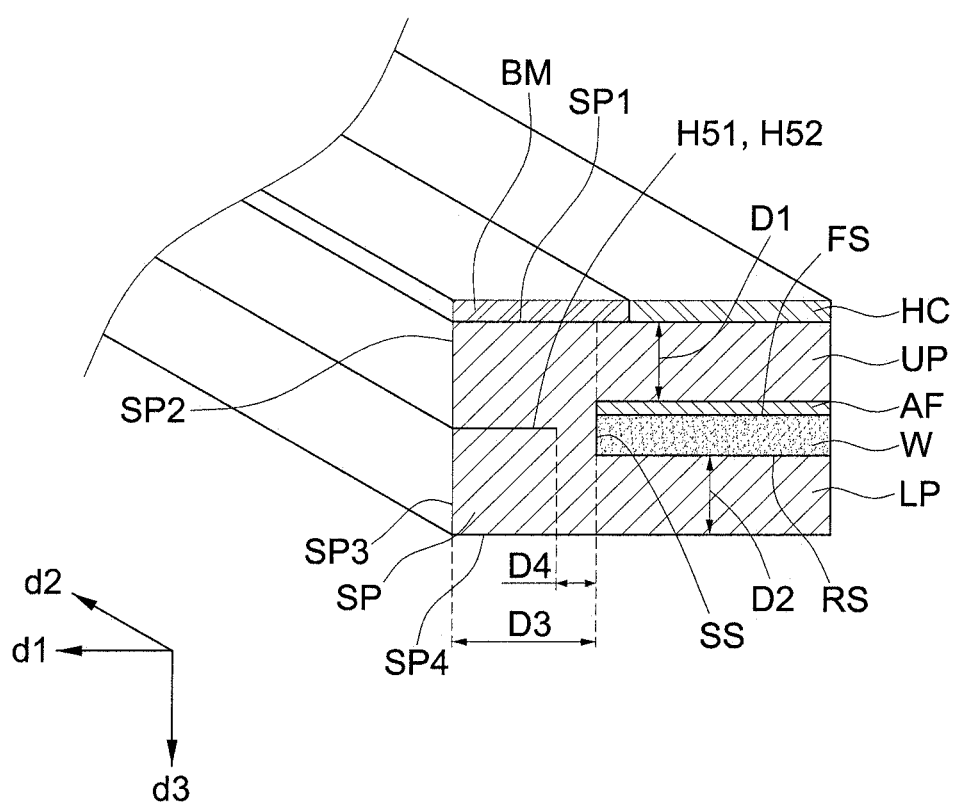

Referring to FIG. 9, the side surface of the side portion SP of the protective film PF may include a first surface SP2 that contacts the upper surface SP1 and a second surface SP3 that contacts the lower surface SP4 of the protective film PF. The side surface of the side portion SP of the protective film PF may include a third surface H51 and a fifth surface H52 that define the depressed portion H between the first surface SP2 and the second surface SP3.

The third surface H51 contacts the first surface SP2, and the fifth surface H52 contacts the second surface SP3. In the embodiment depicted in FIG. 9, the third surface H51 and the fifth surface H52 contact each other, but are not connected to each other. In other embodiments, the third surface H51 and the fifth surface H52 may contact each other and/or may be connected to each other. Accordingly, when the third surface H51 and the fifth surface H52 are separated from each other by an external force, an edge at which the third surface H51 and the fifth surface H52 of the depressed portion H contact each other may be exposed.

The edge at which the third surface H51 and the fifth surface H52 contact each other is a surface that is closest to the side surface SS of the window W and may correspond to the bottom of the depressed portion H. A distance D4 between the edge at which the third surface H51 and the fifth surface H52 contact each other and the side surface SS of the window W (i.e., the width D4 of the side portion SP of the protective film PF at the bottom of the depressed portion H), may be about 200 µm or less, and more preferably about 150 µm or less. The width D4 of the side portion SP of the protective film PF may be about 10 µm or more, and more preferably about 100 µm or more. For example, the width D4 of the side portion SP of the protective PF may be in a range from about 10 µm to about 200 µm, and more preferably a range from about 100 µm to about 150 µm.

The edge, corresponding to the bottom of the depressed portion H, where the third surface H51 and the fifth surface H52 contact each other overlaps the side surface SS of the window W when viewed in the width direction d1 of the side portion SP. For example, the edge at which the third surface H51 and the fifth surface H52 contact each other may be located between the front surface FS and the rear surface RS of the window W in the thickness direction d3 of the side portion SP.

Figure 10:
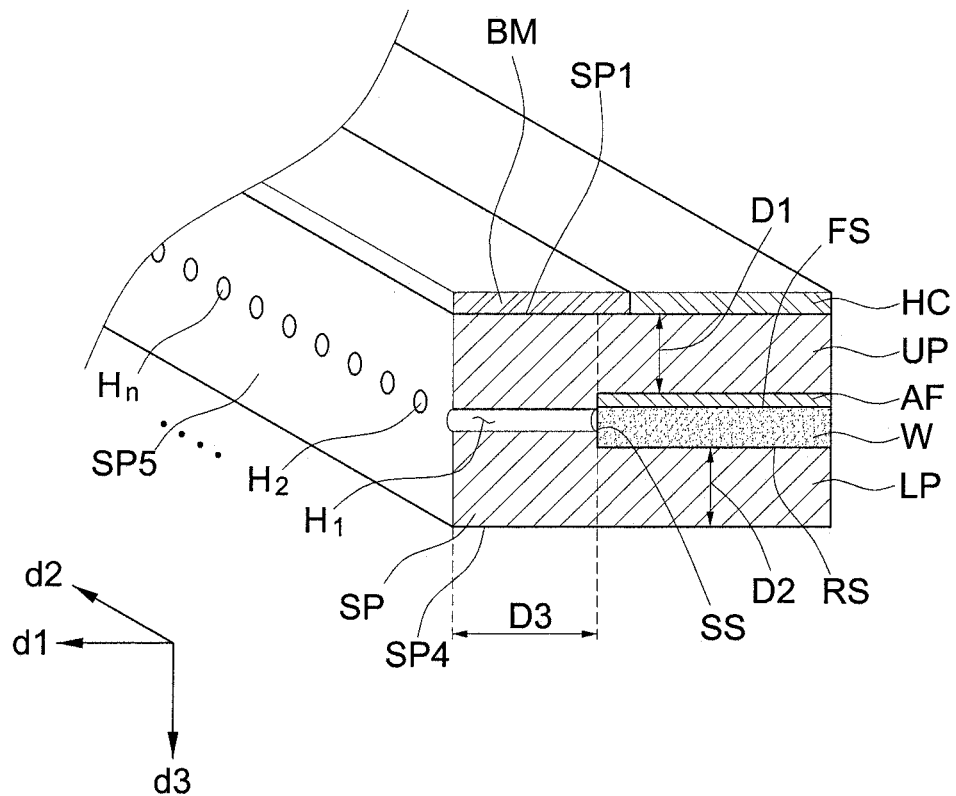

Referring to FIG. 10, the depressed portion H of the protective film PF may include a plurality of depressions H1, H2, . . . , Hn, . . . that are spaced apart from each other. Each of the depressions H1, H2, . . . , Hn, . . . has a circular shape when viewed in a cross-section parallel to the side surface SS of the window W. However, embodiments are not limited thereto, and the shape of the cross-section of each of the depressions H1, H2, . . . , Hn may be an ellipse, a polygon (e.g., a quadrangle), or any other suitable shape.

A side surface SP5 of the side portion SP of the protective film PF may contact the upper surface SP1 and the lower surface SP4 of the protective film PF. The side surface SP5 of the side portion SP of the protective film PF may have circular openings that correspond to the plurality of depressions H1, H2, . . . , Hn.

The plurality of depressions H1, H2, . . . , Hn, . . . are arranged along the length direction d2 of the side portion SP. Each of the plurality of depressions H1, H2, . . . , Hn, . . . may be defined over an entire thickness D3 of the side portion SP of the protective film PF. Each of the depressions H1, H2, . . . , Hn, . . . may be defined through the side portion SP of the protective film PF in the width direction d1 of the side portion SP. Each of centers of the depressions H1, H2, . . . , Hn, . . . may be located between the front surface FS and the rear surface RS of the window W in the thickness direction d3 of the side portion SP. Accordingly, each of the depressions H1, H2, . . . , Hn, . . . may expose a part of the side surface SS of the window W. However, embodiments are not limited thereto, and a depth of each of the depressions H1, H2, . . . , Hn, . . . may be less than the width D3 of the protective film PF. Accordingly, each of the depressions H1, H2, . . . , Hn, . . . may not expose the side surface SS of the window W. A distance between two adjacent ones of the depressions H1, H2, . . . , Hn, . . . may be about 0.5 times to about 2 times a diameter of the depression.

Figure 11A:
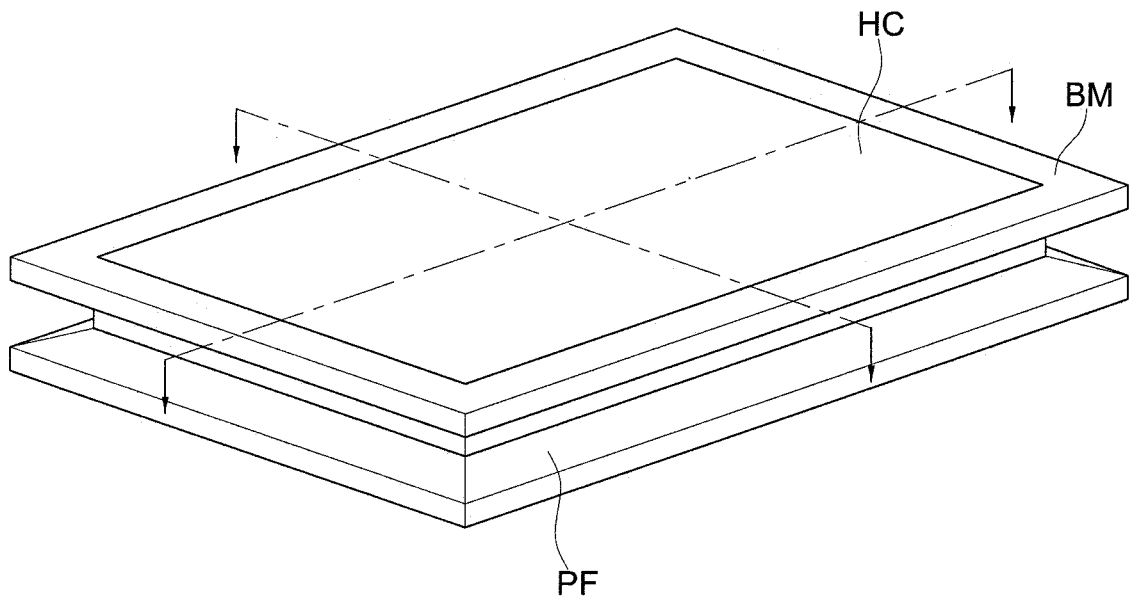
FIG. 11A is a perspective view illustrating a cover member CM according to an embodiment.
Figure 11B:
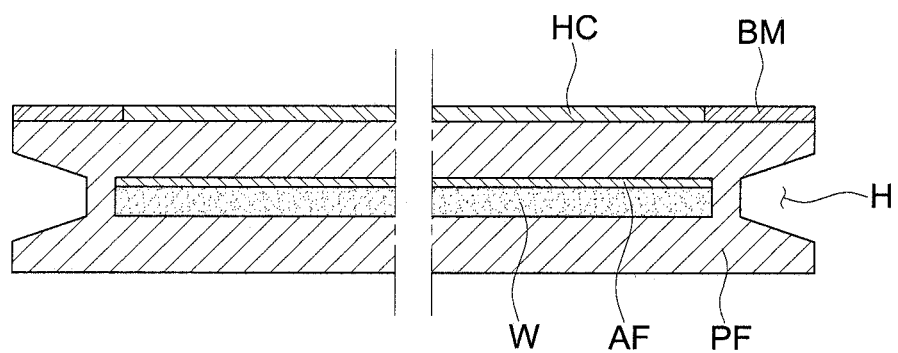
FIG. 11B is a cross-sectional view illustrating the cover member CM illustrated in FIG. 11A in a length direction.
Figure 11C:
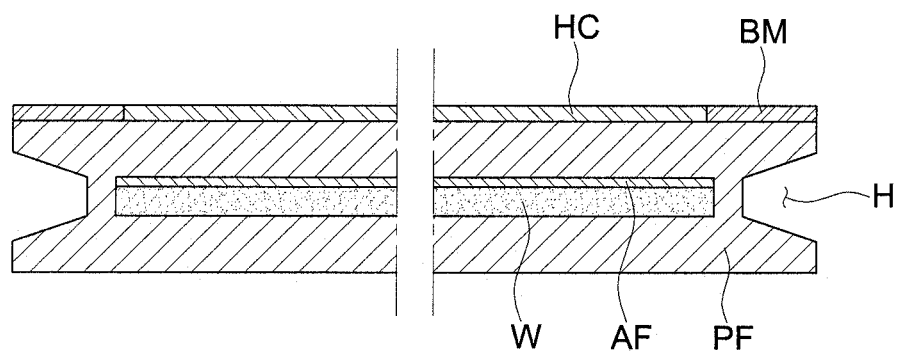
FIG. 11C is a cross-sectional view illustrating the cover member CM illustrated in FIG. 11A in a width direction.

FIG. 11A is a perspective view illustrating a cover member (e.g., a cover) CM according to an embodiment. FIG. 11B is a cross-sectional view illustrating the cover member CM illustrated in FIG. 11A in a length direction. FIG. 11C is a cross-sectional view illustrating the cover member CM illustrated in FIG. 11A in a width direction.

Referring to FIGS. 11A, 11B, and 11C, each of the front surface FS and the rear surface RS of the window W has a quadrangular shape. The side surface SS of the window W may include a first side surface SS and a second side surface SS that face each other and are parallel to the width direction (d2' in FIG. 1) of the window W, and a third side surface SS and a fourth side surface SS that face each other and are parallel to the length direction (d1' in FIG. 1) of the window W. The window W may be longer in the length direction than in the width direction. The window W may include an anti-fingerprint layer AF disposed at the front surface thereof.

The protective film PF may cover all of the first, second, third, and fourth side surfaces SS of the window W. The protective film PF may completely cover and seal all surfaces of the window W. Accordingly, the side portion SP of the protective film PF may be disposed continuously so as to be around (e.g., surround) all the side surfaces SS of the window W. In addition, the depressed portion H may be defined over an entire length of the side portion SP of the protective film PF. The cover member CM may include a light blocking layer BM and a hard coat layer HC that are formed on the protective film PF.

Figure 12A:
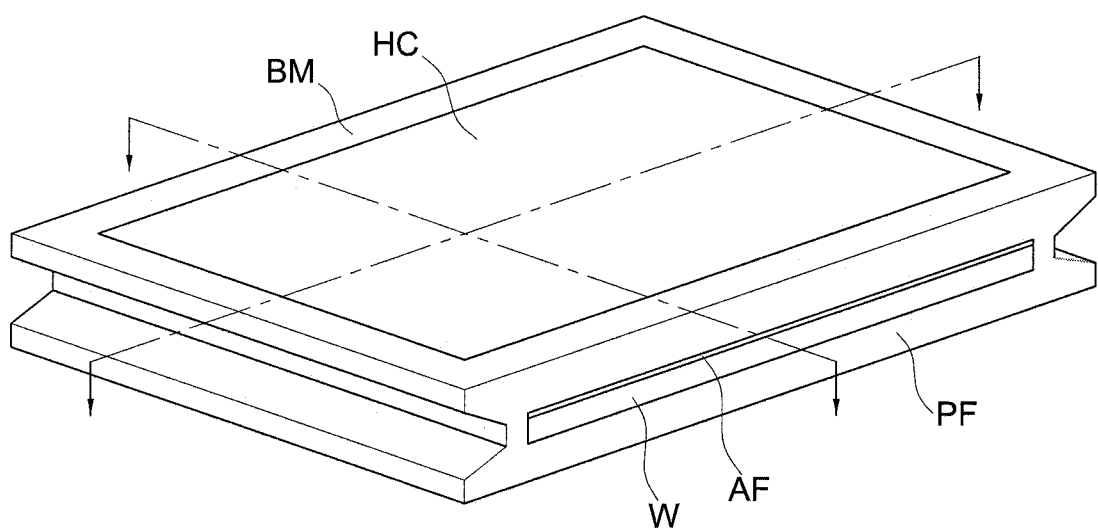
FIG. 12A is a perspective view illustrating a cover member CM according to another embodiment.
Figure 12B:
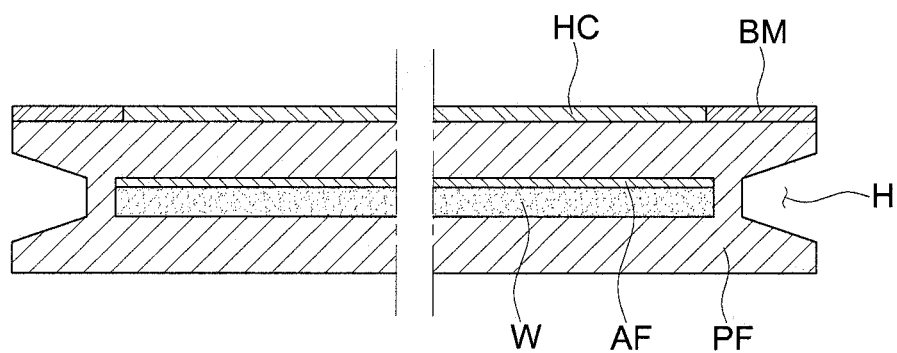
FIG. 12B is a cross-sectional view illustrating the cover member CM illustrated in FIG. 12A in a length direction.
Figure 12C:
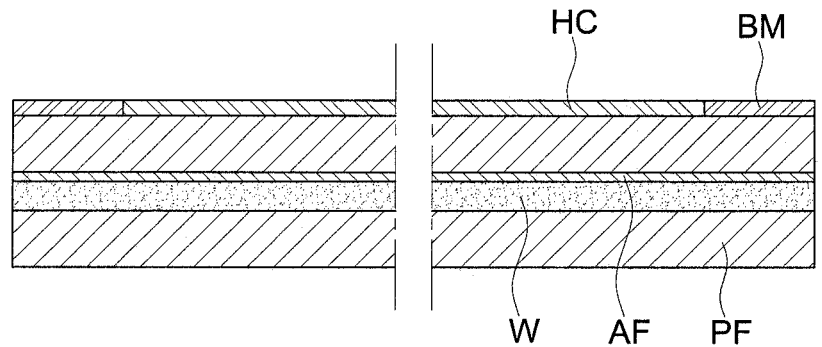
FIG. 12C is a cross-sectional view illustrating the cover member CM illustrated in FIG. 12A in a width direction.

FIG. 12A is a perspective view illustrating a cover member CM according to another embodiment. FIG. 12B is a cross-sectional view illustrating the cover member CM illustrated in FIG. 12A in a length direction. FIG. 12C is a cross-sectional view illustrating the cover member CM illustrated in FIG. 12A in a width direction.

Referring to FIGS. 12A, 12B, and 12C, each of the front surface FS and the rear surface RS of the window W may have a quadrangular shape. The side surface SS of the window W may include a first side surface SS and a second side surface SS that face each other and are parallel to the width direction (d2' in FIG. 1) of the window W, and a third side surface SS and a fourth side surface SS that face each other and are parallel to the length direction (d1' in FIG. 1) of the window W. The window W may be longer in the length direction than in the width direction. The window W may include an anti-fingerprint layer AF disposed at the front surface thereof.

The protective film PF may cover the first side surface SS and the second side surface SS that are parallel to the width direction (d2' in FIG. 1) of the window W. Accordingly, the side portion SP of the protective film PF may be disposed so as to surround only the first side surface SS and the second side surface SS that are parallel to the width direction (d2' in FIG. 1), and the depressed portion H may be defined over the entirety of the side portion SP. The cover member CM may include a light blocking layer BM and a hard coat layer HC that are formed on the protective film PF.

In addition, the third side surface SS and the fourth side surface SS that are parallel to the length direction (d1' in FIG. 1) of the window W are exposed without being covered by the protective film PF. Accordingly, the upper portion UP and the lower portion LP of the protective film PF are not connected to each other on the third side surface SS and the fourth side surface SS that are parallel to the length direction (d1' in FIG. 1).

The folding line along which the display device DD is folded may be parallel to the width direction. In addition, the display device DD may be rolled in the length direction.

FIGS. 13, 14A, 14B, 14C, and 15 are cross-sectional views illustrating a method of manufacturing a cover member (e.g., a cover) CM according to an embodiment.

Figure 13:
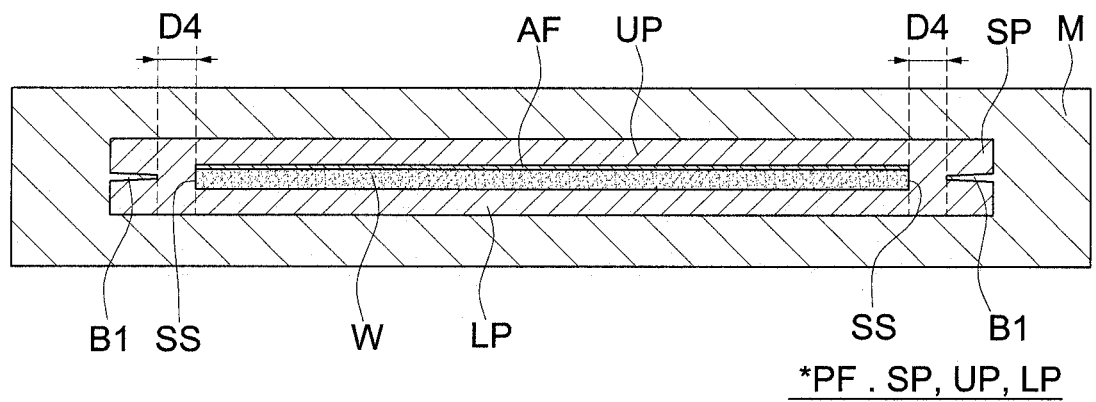
FIGS. 13, 14A, 14B, 14C, and 15 are cross-sectional views illustrating a method of manufacturing a cover member CM according to an embodiment.

Referring to FIG. 13, the protective film PF of the cover member CM according to an embodiment may be manufactured by an insert injection molding method.

The window W which the anti-fingerprint layer AF is attached to or disposed at may be disposed in a mold M. The mold M has a projection B1 that has a wedge shape corresponding to the shape of the depressed portion H described above with reference to FIGS. 5-10. The projection B1 is spaced apart from the side surface SS of the window W by the aforementioned predetermined distance D4. Next, a material for forming the protective film PF may be melted and injected into the mold M to form the upper portion UP, the lower portion LP, and the side portion SP of the protective film PF.

Figure 14A:
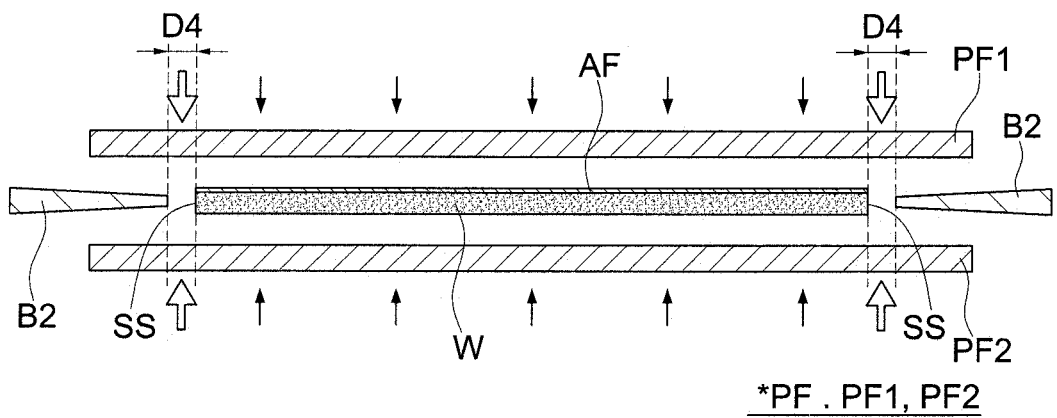
Figure 14B:
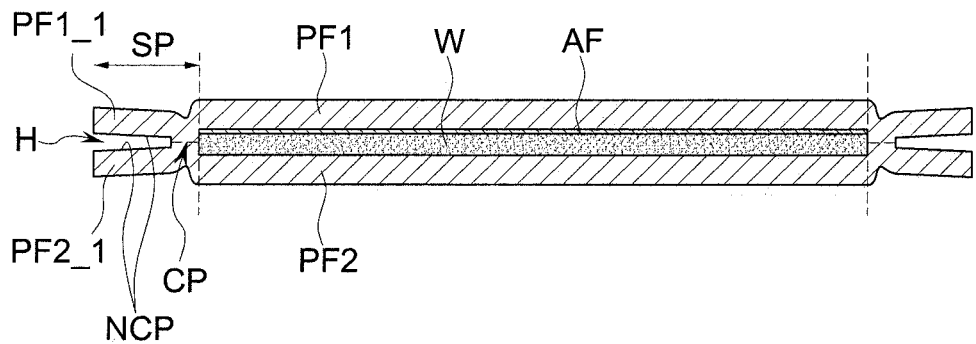
Figure 14C:
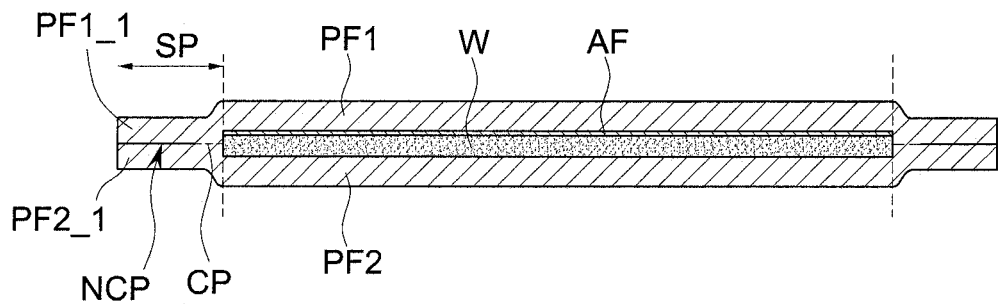

Referring to FIGS. 14A-14C, the protective film PF of the cover member CM according to an embodiment may be manufactured by a transfer lamination or a direct coating method.

First, each projection B2 may have a wedge shape corresponding to the shape of the depressed portion H, described above with reference to FIGS. 5-10, and may be disposed on opposite sides of the window W at which the anti-fingerprint layer AF is attached or disposed. The projection B2 is disposed so as to be spaced apart from the side surface SS of the window W by the predetermined or set distance D4. Next, two films PF1 and PF2 may be disposed on and under the window W (e.g., one film on and one film under window W). Each of the films PF1 and PF2 may be attached to a release paper. Each of the films PF1 and PF2 may be transferred and/or laminated to the window W by heating and/or pressing. Respective edge portions PF1_1 and PF2_1 of the films PF1 and PF2 that do not overlap the window W in a plan view may form the side portions SP of the protective film PF. The respective edge portions PF1_1 and PF2_1 of the films PF1 and PF2 may each include a connection portion CP that may connect the films PF1 and PF2 to each other at a gap between the projection B2 and the side surface SS of the window W. As illustrated in FIGS. 14B-14C, the respective edge portions PF1_1 and PF2_1 of the two films PF1 and PF2 that are spaced apart from each other by the projection B2 may include non-connection portions NCP that are not connected to each other. The connection portion CP may be disposed between the non-connection portion NCP and the side surface SS of the window W in a plan view. Next, the projection B2 having a wedge shape may be removed after a sufficient time has passed to allow each connection portion CP of the two films PF1 and PF2 to connect with each other. In a manufacturing method according to the present embodiment, the side portion SP of the protective film PF formed by the lamination of the two films PF1 and PF2 may have a step difference or a curvature according to the shape of the window W and the projection B2.

As illustrated in FIG. 14B, the non-connection portions NCP of the two films PF1 and PF2 that are not connected to each other may define the depressed portion H corresponding to the shape of the projection B2. When the two films PF1 and PF2 are laminated by heating and/or pressing, each of the films PF1 and PF2 may be deformed in accordance with the shape of the projection B2 and may maintain their shapes even when the projection B2 is removed.

Alternatively, as illustrated in FIG. 14C, the non-connection portions NCP of the two films PF1 and PF2 that are not connected to each other may contact each other due to elasticity of the films PF1 and PF2 when the projection B2 is removed. Accordingly, when the non-connection portions NCP of the two films PF1 and PF2 are separated from each other by an external force, the depressed portion H may be exposed.

Figure 15:
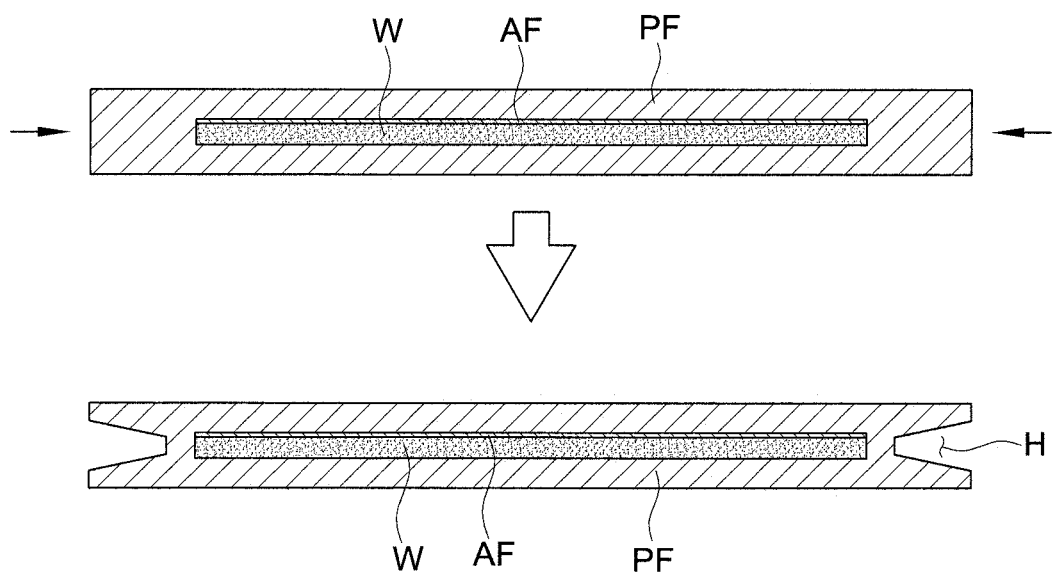

Referring to FIG. 15, the protective film PF of the cover member CM according to an embodiment may be manufactured by a cutting method.

First, the protective film PF that is around (e.g., surrounds) the window W which the anti-fingerprint layer AF is attached to or disposed at may be formed through an insert injection molding method, a transfer lamination method, or a direct coating method as described above with reference to FIGS. 13-14. Next, the side portion SP of the protective film PF that covers the side surface SS of the window W is cut (e.g., by a laser), and the depressed portion H described above with reference to FIGS. 5-10 is formed.

According to an embodiment, because the front surface FS, the rear surface RS, and the side surface SS of the window W are covered by the protective film PF, damage to the window W or the display panel DP due to an external impact may be reduced and scattering of the window W may be substantially reduced or prevented at the time of breakage.

In an embodiment, when the cover member CM is attached to the display panel DP which may be foldable or rollable, the possibility of detachment of the protective film PF that is attached on the window W may increase. In addition, in the case of the window W that includes the anti-fingerprint layer AF, an adhesive force between the anti-fingerprint layer AF and the protective film PF may be lowered, and the possibility of detachment may further increase.

According to an embodiment, because the front surface FS, the rear surface RS, and the side surface SS of the window W are covered by the protective film PF, the possibility of detachment of the protective film PF that is attached to the window W may be decreased when the display panel DP is folded or rolled.

In an embodiment, the protective film PF attached to the front surface FS of the window W may be removed depending on the conditions such as repair or user's preference.

Figure 16:
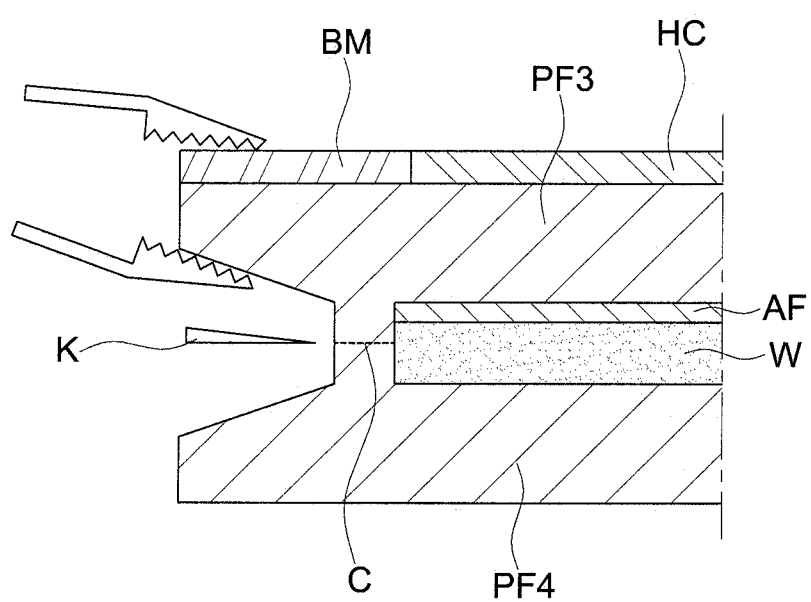
FIG. 16 is a cross-sectional view illustrating a method of removing a protective film on the cover member CM according to an embodiment.

According to an embodiment, as illustrated in FIG. 16, an upper protective film PF3 and a lower protective film PF4 may be separated from each other as desired by the user due to the depressed portion H defined at the protective film PF that covers the side surface SS of the window W. For example, when the upper protective film PF3 is pulled up (e.g., with tweezers), a portion C of the side portion SP of the protective film PF between the side surface SS of the window W and a part of the depressed portion H that has a smallest width may be torn, and the lower protective film PF4 may not be damaged. In addition, by cutting along the depressed portion H with (e.g., a knife), the upper protective film PF3 and the lower protective film PF4 may be separated from each other as desired by the user.

According to an embodiment, light leakage that may occur at an edge of the cover member CM may be reduced. According to an embodiment, the cover member CM may include a light blocking layer BM and a hard coat layer HC that may be formed on the protective film PF. According to an embodiment, by disposing the light blocking layer BM at the edge of the protective film PF, light emitted through an edge of the upper surface SP1 of the protective film PF may be blocked. According to the embodiment, light emitted through the side surface of the protective film PF may be reduced by the depressed portion H defined at the side portion SP of the protective film PF. In addition, according to an embodiment, due to the depressed portion H defined at the side portion SP of the protective film PF, light incident to the side surface of the protective film PF may be reflected or refracted toward the light blocking layer BM disposed above the protective film PF, such that more light may be blocked by the light blocking layer BM.

As set forth hereinabove, according to one or more embodiments, because front, rear, and side surfaces of the window are covered by the protective film, damage to the window or the display panel due to impacts may be reduced, and scattering of the window may be substantially prevented or reduced at the time of breakage.

According to one or more embodiments, the protective film is connected on the front, back, and side surfaces of the window, and thus the possibility of detachment of the protective film that is attached to the window may be reduced when the display panel is folded or rolled.

According to one or more embodiments, due to the depressed portion defined at the protective film that covers the side surface of the window, the upper protective film and the lower protective film may be separated from each other as desired by the user.

According to one or more embodiments, light leakage that may occur at an edge of the cover member may be reduced.

While the present disclosure has been illustrated and described with reference to the embodiments thereof, it will be apparent to those of ordinary skill in the art that various suitable changes in form and detail may be made thereto without departing from the spirit and scope of the present disclosure, and equivalents thereof.

What is claimed is:

1. A display panel cover comprising:
a window having a plate shape and the window having a front surface, a rear surface opposite the front surface, and a first side surface between the front surface and the rear surface; and
a protective film around the window,
wherein the protective film comprises:
an upper portion on the front surface of the window;
a lower portion on the rear surface of the window; and
a side portion on the first side surface of the window and connecting the upper portion and the lower portion of the protective film to each other, and
wherein the side portion of the protective film does not overlap the window in a plan view and has a depressed portion that is depressed toward the first side surface of the window, and the depressed portion does not overlap the window in a plan view.

2. The display panel cover of claim 1, wherein the window comprises an anti-fingerprint layer at the front surface of the window.

3. The display panel cover of claim 1, wherein the window comprises a foldable glass, and has a thickness that is less than or substantially equal to about 75 μm.

4. The display panel cover of claim 1, wherein the window has a second side surface opposite the first side surface, and
the side portion of the protective film is on the second side surface of the window.

5. The display panel cover of claim 4, wherein the window has a third side surface between the first side surface and the second side surface, and a fourth side surface opposite the third side surface, and
the side portion of the protective film is on the third side surface and the fourth side surface of the window.

6. The display panel cover of claim 4, wherein the window has a third side surface between the first side surface and the second side surface, and a fourth side surface opposite the third side surface, and
the third side surface and the fourth side surface of the window are not covered by the protective film.

7. The display panel cover of claim 1, wherein the side portion of the protective film covers an entire portion of the first side surface of the window.

8. The display panel cover of claim 1, wherein a bottom of the depressed portion that is closest to the first side surface of the window in a direction perpendicular to the first side surface of the window is located between a plane of the front surface of the window and a plane of the rear surface of the window.

9. The display panel cover of claim 8, wherein a distance between the bottom of the depressed portion and the first side surface of the window is in a range from about 10 μm to about 200 μm.

10. The display panel cover of claim 8, wherein the depressed portion extends over an entire portion of the side portion in a direction parallel to the front surface and the first side surface of the window.

11. The display panel cover of claim 1, wherein the depressed portion comprises a plurality of depressions spaced apart from each other, and
the plurality of depressions are arranged between a plane of the front surface of the window and a plane of the rear surface of the window.

12. The display panel cover of claim 11, wherein at least a part of the plurality of depressions expose the first side surface of the window.

13. The display panel cover of claim 1, further comprising a light blocking layer that is at an upper surface of the side portion of the protective film and at an upper surface of the upper portion adjacent to the side portion, and overlaps the depressed portion and the first side surface of the window in the plan view.

14. The display panel cover of claim 1, wherein the side portion of the protective film comprises:
a first edge portion extending from the upper portion of the protective film; and
a second edge portion extending from the lower portion of the protective film,
wherein the first edge portion and the second edge portion comprise:
respective connection portions located within a set distance from the first side surface of the window adjacent thereto, the respective connection portions being connected to each other; and
respective non-connection portions located out of the set distance and not connected to each other.

15. The display panel cover of claim 14, wherein the non-connection portions of the first and second edge portions are spaced apart from each other.

16. The display panel cover of claim 1, further comprising a hard coating layer at an upper surface of the upper portion of the protective film.

17. The display panel cover of claim 1, wherein each of the upper portion and the lower portion of the protective film has a thickness in a range from about 100 μm to about 200 μm.

18. The display panel cover of claim 1, wherein the side portion of the protective film has a length that is greater than or substantially equal to about 500 μm in a direction perpendicular to the first side surface of the window.

19. The display panel cover of claim 1, wherein the protective film has a Young's modulus that is less than or substantially equal to about 500 MPa.

20. A display device comprising:
a display panel; and
a cover on the display panel,
wherein the cover comprises:
a window having a plate shape and having a front surface, a rear surface opposite the front surface, and a side surface between the front surface and the rear surface; and
a protective film around the window, and
wherein the protective film comprises:
a lower portion between the rear surface of the window and the display panel;
an upper portion on the front surface of the window; and
a side portion on the side surface of the window, and connecting the upper portion and the lower portion of the protective film, the side portion in its entirety being offset from the window in a direction parallel to the front surface of the window and having a first inner surface and a second inner surface that face each other, and the first inner surface and the second inner surface do not overlap the window in a plan view.

21. The display device of claim 20, wherein the display device is foldable or rollable.

* * * * *